United States Patent
McMahon

(10) Patent No.: US 8,305,456 B1
(45) Date of Patent: Nov. 6, 2012

(54) SYSTEMS AND METHODS FOR TRANSMITTING AND RECEIVING ARRAY CAMERA IMAGE DATA

(75) Inventor: Andrew Kenneth John McMahon, Menlo Park, CA (US)

(73) Assignee: Pelican Imaging Corporation, Mountain View, CA (US)

( * ) Notice: Subject to any disclaimer, the term of this patent is extended or adjusted under 35 U.S.C. 154(b) by 0 days.

(21) Appl. No.: 13/470,252

(22) Filed: May 11, 2012

Related U.S. Application Data

(60) Provisional application No. 61/484,920, filed on May 11, 2011.

(51) Int. Cl.
 *H04N 5/225* (2006.01)
(52) U.S. Cl. .................. 348/218.1; 348/207.1
(58) Field of Classification Search .................. None
 See application file for complete search history.

(56) References Cited

U.S. PATENT DOCUMENTS

| | | | |
|---|---|---|---|
| 4,323,925 A * | 4/1982 | Abell et al. ................. | 348/340 |
| 5,005,083 A * | 4/1991 | Grage et al. ................. | 348/588 |
| 6,137,535 A * | 10/2000 | Meyers ...................... | 348/340 |
| 6,141,048 A * | 10/2000 | Meyers ...................... | 348/294 |
| 6,611,289 B1 * | 8/2003 | Yu et al. ...................... | 348/265 |
| 6,765,617 B1 * | 7/2004 | Tangen et al. ............... | 348/340 |
| 6,903,770 B1 * | 6/2005 | Kobayashi et al. .......... | 348/296 |
| 7,199,348 B2 * | 4/2007 | Olsen et al. ................. | 250/208.1 |
| 7,262,799 B2 * | 8/2007 | Suda ........................... | 348/280 |
| 2002/0094027 A1 | 7/2002 | Sato et al. | |
| 2004/0174439 A1 | 9/2004 | Upton | |
| 2005/0286612 A1 | 12/2005 | Takanashi | |
| 2006/0187338 A1 * | 8/2006 | May et al. ................... | 348/375 |
| 2006/0251410 A1 * | 11/2006 | Trutna, Jr. ................... | 396/55 |
| 2007/0002159 A1 * | 1/2007 | Olsen et al. ................. | 348/335 |
| 2008/0084486 A1 | 4/2008 | Enge et al. | |
| 2009/0284651 A1 | 11/2009 | Srinivasan | |
| 2010/0142839 A1 * | 6/2010 | Lakus-Becker ............. | 382/244 |
| 2010/0220212 A1 | 9/2010 | Perlman et al. | |
| 2010/0231285 A1 * | 9/2010 | Boomer et al. ............. | 327/403 |
| 2011/0069189 A1 * | 3/2011 | Venkataraman et al. .. | 348/218.1 |
| 2011/0080487 A1 * | 4/2011 | Venkataraman et al. .. | 348/218.1 |

(Continued)

FOREIGN PATENT DOCUMENTS
WO   WO 2009151903 A2 * 12/2009

OTHER PUBLICATIONS
International Search Report and Written Opinion for International Application PCT/US2012/37670, International Filing Date May 11, 2012, Search Completed Jul. 5, 2012, Mailed Jul. 18, 2012, 9 pgs.

*Primary Examiner* — Justin P Misleh
(74) *Attorney, Agent, or Firm* — Kauth, Pomeroy, Peck & Bailey LLP

(57) ABSTRACT

Systems and methods for transmitting and receiving image data captured by an imager array including a plurality of focal planes are described. One embodiment of the invention includes capturing image data using a plurality of active focal planes in a camera module, where an image is formed on each active focal plane by a separate lens stack, generating lines of image data by interleaving the image data captured by the plurality of active focal planes, and transmitting the lines of image data and the additional data.

26 Claims, 7 Drawing Sheets

U.S. PATENT DOCUMENTS

2011/0122308 A1* 5/2011 Duparre .................. 348/340
2011/0279721 A1* 11/2011 McMahon ................ 348/302
2011/0285866 A1* 11/2011 Bhrugumalla et al. .... 348/218.1
2011/0310980 A1* 12/2011 Mathew ................ 375/240.26
2012/0012748 A1* 1/2012 Pain et al. .................. 250/332
2012/0026342 A1* 2/2012 Yu et al. .................... 348/207.1
2012/0147205 A1* 6/2012 Lelescu et al. ............. 348/218.1

* cited by examiner

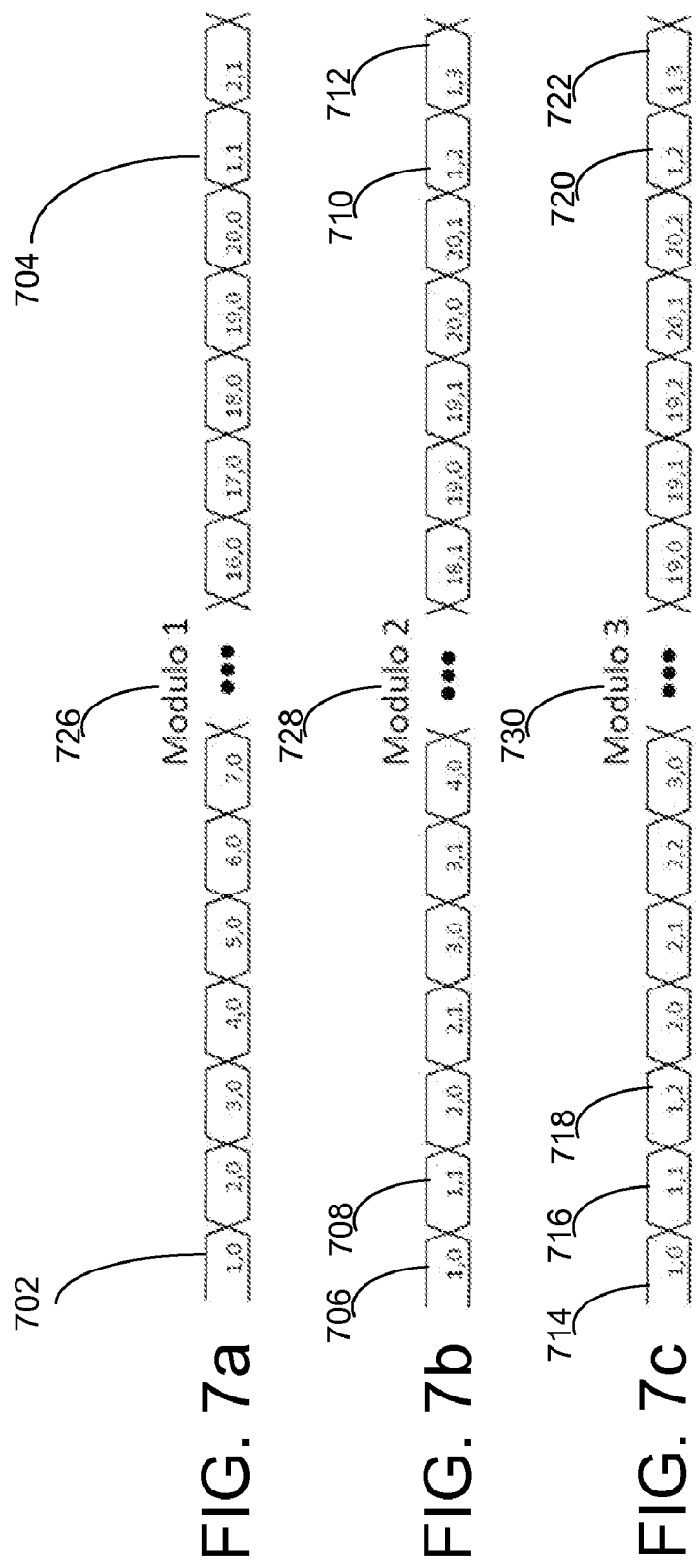

SYSTEMS AND METHODS FOR TRANSMITTING AND RECEIVING ARRAY CAMERA IMAGE DATA

CROSS-REFERENCE TO RELATED APPLICATIONS

The current application claims priority to U.S. Provisional Patent Application No. 61/484,920, filed May 11, 2011, the disclosure of which is incorporated herein by reference.

FIELD OF THE INVENTION

The present invention is generally related to array cameras and more specifically to the transmission of image data from an imager array to an external device such as a processor.

BACKGROUND OF THE INVENTION

In a typical camera, light enters through an opening (aperture) at one end of the camera and is directed to a focal plane by a lens stack. The lens stack creates an optical channel that forms an image of a scene upon the focal plane. The focal plane includes an array of light sensitive pixels, which are part of a sensor that generates signals upon receiving light via the optical element. Commonly used sensors include CCD (charge-coupled device) sensors and CMOS (complementary metal-oxide-semiconductor) sensors.

Traditional cameras typically use a single focal plane to capture single images, one at a time. The image data from each pixel of the focal plane is then sent directly from the focal plane to a processor. The processor can manipulate the image data, such as to encode the image data, store the image data, forward the image data or modify the image data. In many instances, a standard interface is utilized between the focal plane and processor, which specifies the format in which data is transmitted between the focal plane and the processor.

The Mobile Industry Processor Interface Alliance (MIPI) is a non-profit corporation that has promulgated interface specifications for consistency to promote reuse and compatibility in mobile devices. MIPI has created the Camera Serial Interface 2 (c) interface format (MIPI interface format) for an interface between a camera and a processor.

SUMMARY OF THE INVENTION

Systems and methods in accordance with embodiment of the invention are involve the transmission and/or reception of image data captured by a camera module including a plurality of focal planes. In several embodiments, the image data is used to generate lines of image data that interleave image data captured by the pixels of different focal planes. In many embodiments, the sensor in the camera module also generates additional data describing the captured image data. In a number of embodiments, the additional data is transmitted with the lines of image data and used by the interface circuitry on a device receiving the lines of image data to identify which pixels in the lines of image data are associated with one or more of the plurality of images captured by the focal planes of the camera module.

One embodiment of the invention includes capturing image data using a plurality of active focal planes in a camera module, where an image is formed on each active focal plane by a separate lens stack, generating lines of image data by interleaving the image data captured by the plurality of active focal planes, and transmitting the lines of image data and the additional data.

A further embodiment also includes additional data providing information for deinterleaving a plurality of images from the captured image data and transmitting the additional data with the lines of image data.

In another embodiment, the additional data describes the imager array.

In a still further embodiment, the additional data includes data selected from the group of additional data describing: the number of focal planes in the imager array; the dimensions of the array of focal planes in the imager array; the number of pixels in each dimension of the active focal planes; the integration time of the pixels in each of the active focal planes; and the gain of the pixels in each of the active focal planes In still another embodiment, the additional data describing the gain of pixels includes additional data describing the analog gain of the pixels in each of the active focal planes and additional data describing the digital gain of the pixels in each of the active focal planes.

In a yet further embodiment, generating the lines of image data further comprises combining captured image data from the plurality of active focal planes using a predetermined process.

In yet another embodiment, the predetermined process is selected from a plurality of predetermined processes for combining captured image data, and the additional data includes additional data indicating the predetermined process used to combine the captured image data.

In a further embodiment again, each active focal plane comprises an array of pixels including a plurality of rows of pixels that also form a plurality of columns of pixels, and the predetermined process for combining captured image data comprises interleaving image data from a row selected from each of the active focal planes.

In another embodiment again, the predetermined process for combining captured image data comprises using a modulo process, where the modulo process involves combining the image data captured by each of the pixels in the selected rows of the active focal planes by interleaving predetermined numbers of pixels from each of the selected rows.

In a further additional embodiment, the additional data describes at least one of the lines of image data.

In another additional embodiment, the additional data includes data selected from the group consisting of additional data describing: the time at which each active focal plane started capturing the image data; and the row numbers of the rows in each of the active focal planes used to capture the image data used to generate the line of image data.

A still yet further embodiment also includes packetizing the lines of image data and the additional data describing the captured image data to produce at least one packet of data. In addition, transmitting the lines of image data and the additional data further comprises transmitting the at least one packet of data.

In still yet another embodiment the packet of data includes a packet header containing at least a portion of the additional data and a plurality of lines of image data, and the additional data contained in the packet header describes the imager array.

In a still further embodiment again, the packet of data further includes a packet footer indicating the end of the transmission of the plurality of lines of image data.

In still another embodiment again, the packet of data comprises a plurality of lines of image data and a line header associated with each of the plurality of lines of image data, and each line header includes additional data describing the line of image data with which the line header is associated.

In a yet further embodiment again, the line head further comprises additional data describing the imager array.

Yet another embodiment again also includes pausing transmission during frame blanking intervals, transmitting the plurality of lines of image data and the additional data describing the captured image data between frame intervals, and pausing during the transmission of the plurality of lines of image data and the additional data describing the captured image data during line blanking intervals.

A yet further additional embodiment also includes continuously transmitting the lines of image data and the additional data until all of the data is transmitted.

In yet another additional embodiment each lens stack in the camera module has a different field of view.

An embodiment of a method for receiving image data includes receiving image data from a camera module including a plurality of focal planes using interface circuitry, where the image data comprises lines of image data generated by interleaving pixels from a plurality of images captured using the plurality of focal planes, and identifying the pixels in the image data that are part of at least one of the plurality of images using the interface circuitry.

In a further embodiment of a method for receiving image data, the camera module also generates additional data describing the captured image data and the method further includes receiving the additional data, and identifying the pixels in the image data that are part of at least one of the plurality of images using the interface circuitry further comprises identifying the pixels in the image data that are part of at least one of the plurality of images using the additional data.

In another embodiment of a method for receiving image data, the additional data includes data selected from the group consisting of additional data describing: the number of focal planes in the imager array; the dimensions of the array of focal planes in the imager array; the number of pixels in each dimension of the focal planes; the integration time of the pixels in each of the focal planes; and the gain of the pixels in each of the focal planes.

In a yet further embodiment, the additional data describing the gain of pixels includes additional data describing the analog gain of the pixels in each of the active focal planes and additional data describing the digital gain of the pixels in each of the active focal planes.

In yet another embodiment, the received lines of image data are generated using one of a plurality of predetermined processes, and the additional data identifies the predetermined process used to generate the lines of image data.

In a further embodiment again, the interface circuitry includes a processor configured to identify the pixels in the image data that are part of at least one of the plurality of images.

An embodiment of a system for receiving image data in accordance with an embodiment of the invention includes interface circuitry configured to receive image data from a camera module including a plurality of focal planes, where the image data comprises lines of image data generated by interleaving pixels from a plurality of images captured using the plurality of focal planes. In addition, the interface circuitry is further configured to identify the pixels in the image data that are part of at least one of the plurality of images using the interface circuitry.

In a further embodiment of a system for receiving image data, the camera module also generates additional data describing the captured image data and the interface circuitry is further configured to receive the additional data, and identify the pixels in the image data that are part of at least one of the plurality of images using the additional data.

In another embodiment of a system for receiving image data, the additional data includes data selected from the group of additional data describing: the number of focal planes in the imager array; the dimensions of the array of focal planes in the imager array; the number of pixels in each dimension of the focal planes; the integration time of the pixels in each of the focal planes; and the gain of the pixels in each of the focal planes.

In a still further embodiment, the additional data describing the gain of pixels includes additional data describing the analog gain of the pixels in each of the focal planes and additional data describing the digital gain of the pixels in each of the focal planes.

In still another embodiment, the interface circuitry includes a processor configured to identify the pixels in the image data that are part of at least one of the plurality of images.

BRIEF DESCRIPTION OF THE DRAWINGS

FIGS. 7a-7c conceptually illustrate lines of image data transmitted by interleaving image data from multiple focal planes using modulo processes in accordance with an embodiment of the invention.

DETAILED DESCRIPTION

Figure 1:
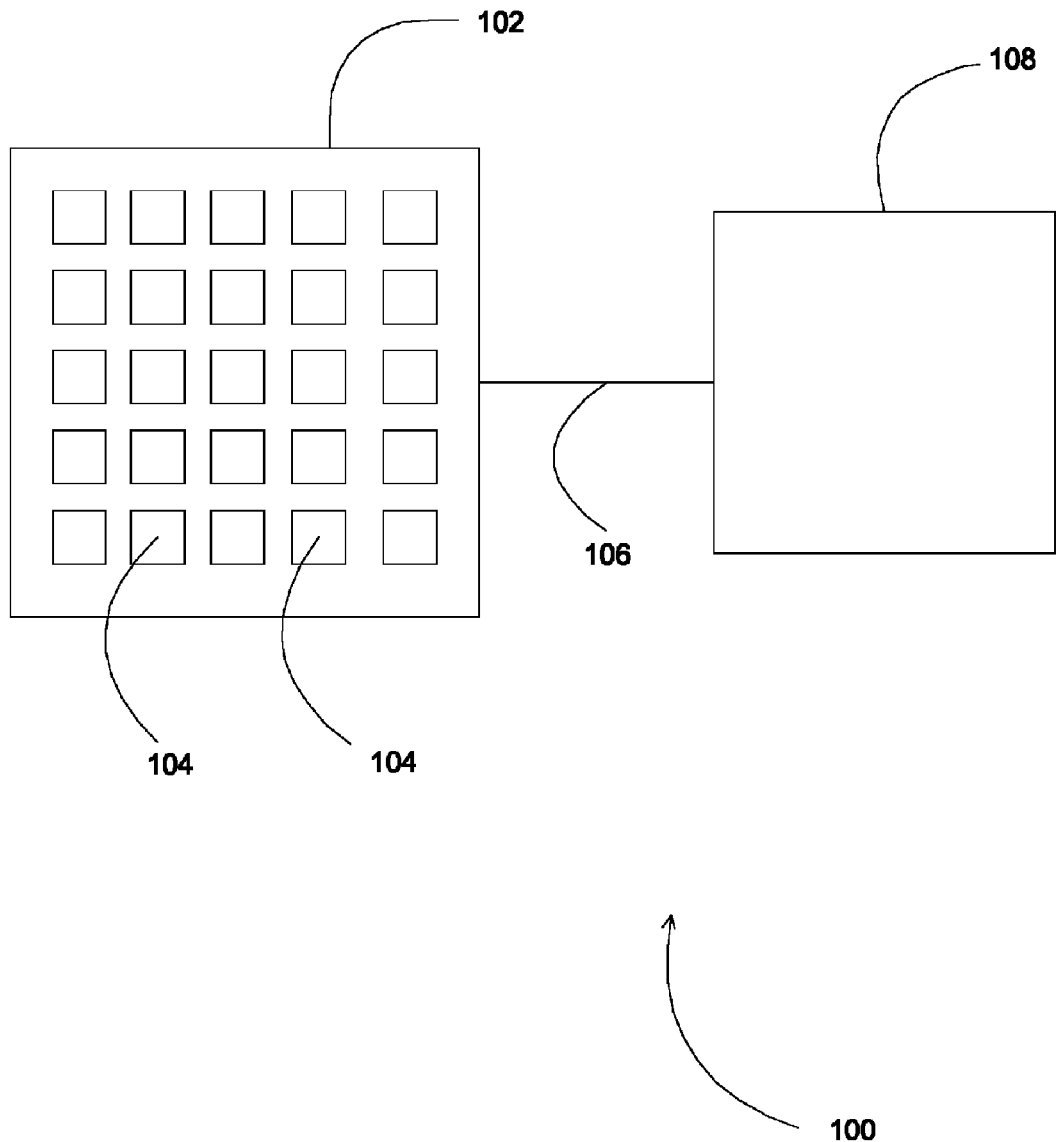
FIG. 1 illustrates an array camera in accordance with an embodiment of the invention.

Turning now to the drawings, systems and methods for transmitting and receiving image data captured by an imager array are illustrated. In several embodiments, the imager array is configured to transmit image data to a processor and additional data describing the image data that is being transmitted. A device receiving the image data can use the additional data to reconstruct a plurality of images of a scene captured by the imager array (often referred to as a light field). In several embodiments, the image data and the additional data describing the image data are transmitted as a packet of image data that can include a packet header as well as lines of image data, where each line of image data is preceded by a line header. The lines of image data include the image data captured by focal planes of the imager array and can be utilized to construct a plurality of images of a scene. The line header can include data identifying the particular pixels and focal planes that are included in a line of image data. In embodiments where a packet header is present, the packet header can include embedded data that describes the camera module to enable a processor to construct images from the packet of image data.

In a variety of embodiments, a line of image data can correspond to a row, column or any organization of image data corresponding to particular pixels from an image captured by one or more of the focal planes in the imager array. In many embodiments, a line of image data can include specific pixels from some or all of the focal planes of an imager array.

All of the image data captured by a focal plane in the imager array can constitute a low resolution image (the term low resolution here is used only to contrast with higher resolution images that can be synthesized through super-resolution processing), which the processor can use in combination with other images captured by the imager array to construct a higher resolution image through super-resolution processing. Super-resolution processing is discussed in U.S. patent application Ser. No. 12/967,807 entitled "Systems and Methods for Synthesizing High Resolution Images Using Super-Resolution Processes", filed Dec. 14, 2010, the disclosure of which is hereby incorporated by reference in its entirety. The processes for transmitting multiple images in accordance with embodiments of the invention are more general, however, than transmitting images to a processor for performing super-resolution processing. Accordingly, processes in accordance with embodiments of the invention can be used to transmit captured image data for multiple images of a scene in a variety of applications including but not limited to slow motion video applications involving registering of images captured from different perspectives, and conventional video applications involving the capture of a sequence of sets of images to synthesize a sequence of high resolution frames using super-resolution processes.

In a number of embodiments, the imager array is configured to transmit image data generated by focal planes via an interface format. The captured image data is transmitted in accordance with the interface format as a packet. These packets can be adapted to accord with any interface format, including but not limited to the MIPI CSI-2 interface format (MIPI interface format).

Imager arrays, interface formats used to transfer captured image data between imager arrays and processors, and processes for formatting captured image data into packets for transfer via an interface format in accordance with embodiments of the invention are discussed further below.

System Architecture

Array cameras in accordance with many embodiments of the invention can include a camera module and a processor. The camera module can include an array of cameras. In various embodiments, an array camera includes a camera module and a processor. A camera module can include an imager array, which is a sensor that includes an array of focal planes. Each focal plane includes an array of pixels used to capture an image formed on the focal plane by a lens stack. The focal plane can be formed of, but is not limited to, traditional CIS (CMOS Image Sensor), CCD (charge-coupled device), high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same color filter. In a number of embodiments, at least one of the focal planes includes a Bayer-pattern filter. In several embodiments, the focal planes are independently controlled. In other embodiments, the operation of the focal planes in the imager array is controlled via a single set of controls.

An array camera in accordance with an embodiment of the invention is illustrated in FIG. 1. The array camera 100 includes a camera module 102 that is configured to transmit (106) image data to a receiving device 108 via an interface format involving the transmission of additional data describing the transmitted image data. The camera module 102 includes an array of cameras 104. The cameras 104 in the camera module 102 are formed from the combination of a lens stack and a focal plane. The camera module 102 can include an optic array of lens stacks and an imager array of focal planes. These multiple cameras 104 may be active or inactive at any given time. Array cameras are discussed in U.S. patent application Ser. No. 13/106,797 entitled "Architectures for imager arrays and array cameras" and U.S. patent application Ser. No. 12/952,106 entitled "Capturing and processing of images using monolithic camera array with heterogeneous imagers" the disclosure of both applications is hereby incorporated by reference in its entirety. The image data captured by these multiple cameras is sent from the focal planes of each camera to a processor. The focal planes may have different imaging characteristics, such as varying exposure times, start times, and end times. Therefore, the timing of the transmission of the image data captured by each focal plane can vary. Accordingly, the imager array can transmit additional data describing the image data to enable a device receiving the image data to appropriately reconstruct images from the received image data.

In many embodiments, the array camera 100 captures images using a plurality of cameras 104, which can have different imaging characteristics. The array camera 100 can separately control each of the cameras to obtain enhanced image capture and/or to enhance processes such as (but not limited to) super-resolution processes that may be applied to the captured images. For example, each pixel of a focal plane may capture different wavelengths of light, or may capture the intensity of light, varying exposure times, start times, or end times. Once the array camera 100 has commenced capturing image data using the pixels on the imager array, the focal planes can commence transmitting the image data captured using the pixels to a receiving device 108. The image data captured by different camera modules can be interleaved for transmission to a receiving device 108 that includes interface circuitry configured to receive image data. In many embodiments, the interface circuitry is implemented in hardware and/or using a processor. The receiving device 108 can then organize the captured image data from the received packet and appropriately combine the image data to reconstruct the image(s) captured by one or more of the focal planes in the imager array.

In the illustrated embodiment, multiple images of a scene can be captured by the camera module 102. As the image data is captured, the camera module 102 transmits (106) the image data to a receiving device 108. The camera module 102 transmits the image data using a small number of local data storage cells on the camera module 102 that store the captured image data following capture by the cameras. The camera module 102 manages the capture and transmission of image data so that the captured image data stored in the storage cells is transmitted by the imager array 102 in the time taken to capture and load the next set of image data into the storage cells. In this way, the camera module can continuously buffer and transmit image data using a number of local data storage cells that is less than the total number of pixels in the camera module.

A line of image data transmitted by an imager array can be considered to equal the number of pixels in a row (column) of a focal plane multiplied by the number of focal planes. In several embodiments, the clock frequency of transmitter circuitry on the imager array is set to a desired output data rate and the internal focal plane pixel rate is set to 1/N the desired output data rate (where N is the total number of focal planes). In many image transmission protocols, once a start of line condition is sent, all of image data is transmitted without interrupt until the end of line. Accordingly, a sufficient number of data storage cells and a buffering mechanism can be developed that starts transmission of pixels once there are sufficient pixels stored such that all of the pixels will have been captured and transmitted by the time the end of the line of image data is reached. If, for example, an imager array including 16 focal planes (as in a 4×4 array) transmits image data from all focal planes, then there is very little data storage utilized prior to the start of focal plane readout, because the data is transmitted at approximately the rate that at which it is being read. If, however, the same imager array only has one active imager, then almost all of the pixels from a row (column) of the focal plane are stored since the buffer is being read 16 times as fast as it is being written. Therefore, the data storage requirement would be one row of pixels (i.e. $\frac{1}{16}^{th}$ of a line of image data). When eight focal planes are active, half the data from all eight focal planes is buffered before transmission commences to avoid underflow. Therefore, the total number of data storage cells utilized is equal to four rows of pixels or one quarter of a line of image data. The above examples illustrate how the data storage requirements of an imager array can vary based upon the number of active focal planes. In many embodiments, the total number of storage cells within an imager array is less than a quarter of a line of image data. In several embodiments, the total number of storage cells within an imager array is equal to a line of image data. In several embodiments, the total number of data storage cells is between a quarter of a line of image data and a full line of image data. In a number of embodiments, the total number of storage cells is equal to or greater than a line of image data. When the camera module transmits the captured image data, the incorporation of additional data describing the image data enables a peripheral device receiving the image data to reconstruct the images captured by each active camera in the imager array 102.

Imager arrays in accordance with many embodiments of the invention are configured to output image data via an interface format that accommodates the transfer of image data captured via multiple focal planes. In several embodiments, the imager array is configured to transmit captured image data in accordance with an interface format that is compatible with standard interface formats, such as (but not limited to) the MIPI CSI-2 interface format (MIPI interface format), the Camera Link interface format, and any of the Universal Serial Bus (USB) interface formats or FireWire interface formats. When image data captured from multiple focal planes is output by the imager array, the device receiving the image data is faced with the task of assembling the image data into a plurality of images of a scene.

Although specific array camera system architectures are discussed above, any of a variety of system architectures for array cameras can be utilized as appropriate to the requirements of a specific application in accordance with embodiments of the invention. The transmission of image data captured by a plurality of focal planes on an imager array and additional data describing the image data that enables a receiver to reconstruct images from the image data in accordance with embodiments of the invention is discussed below.

Identification of Focal Planes

Figure 2:
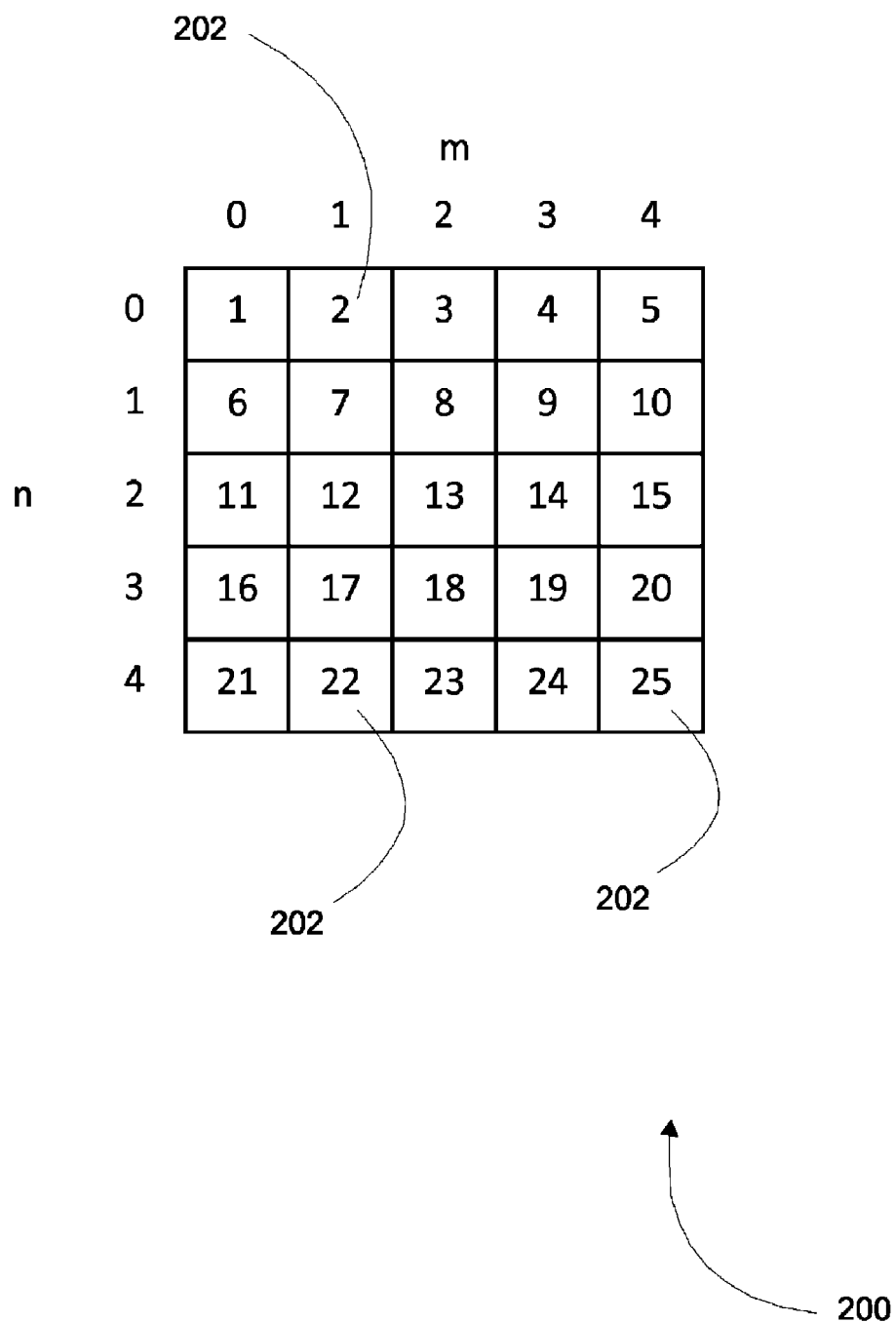
FIG. 2 illustrates an imager array in accordance with an embodiment of the invention.

Due to the fact that imager arrays in accordance with many embodiments of the invention can capture image data using more than one focal plane, processes for transmitting the captured image data include mechanisms for identifying the specific focal plane used to capture a specific set of image data. A convention is typically adopted for identifying specific focal planes within an imager array. Focal planes on an imager array in accordance with an embodiment of the invention are conceptually illustrated in FIG. 2. The illustrated imager array 200 includes a 5×5 array of focal planes 202. Each focal plane 202 includes an array of pixels.

The focal planes on an imager array can be considered to be arranged in a matrix of "M" rows of focal planes, on a row axis notated as "m", and "N" columns of focal planes, on a column axis notated as "n." Individual focal planes can be identified based upon their location within the imager array. In certain embodiments, a numbering convention is used in which the focal plane number is defined by the following equation:

$$\text{Focal plane number} = (m + (n*M)) + 1$$

where m is the horizontal index into the imager array from 0 to M−1;
n is the vertical index into the imager array from 0 to N−1;
M is the total number of focal planes in the horizontal direction; and
N is the total number of focal planes in the vertical direction.

In the illustrated embodiment, the horizontal index, or row, of focal planes is numbered from 0 to 4. The vertical index, or column, of focal planes is numbered from 0 to 4. Thereby, each row and column has 5 focal planes for a total number of 25 focal planes in the illustrated array of focal planes. In many embodiments, the numbering starts at the top left corner of the imager array. In other embodiments, alternative conventions are used to number the focal planes.

Although specific focal plane numbering conventions are discussed above, any of a variety of different conventions can be utilized to identify a focal plane. Given a specific convention, the identity of a focal plane utilized to capture specific image data can be transmitted with the image data. Processes for transmitting image data with information identifying the focal plane that captured the image data are discussed further below.

Packetizing Image Data Captured by Multiple Focal Planes

Figure 3:
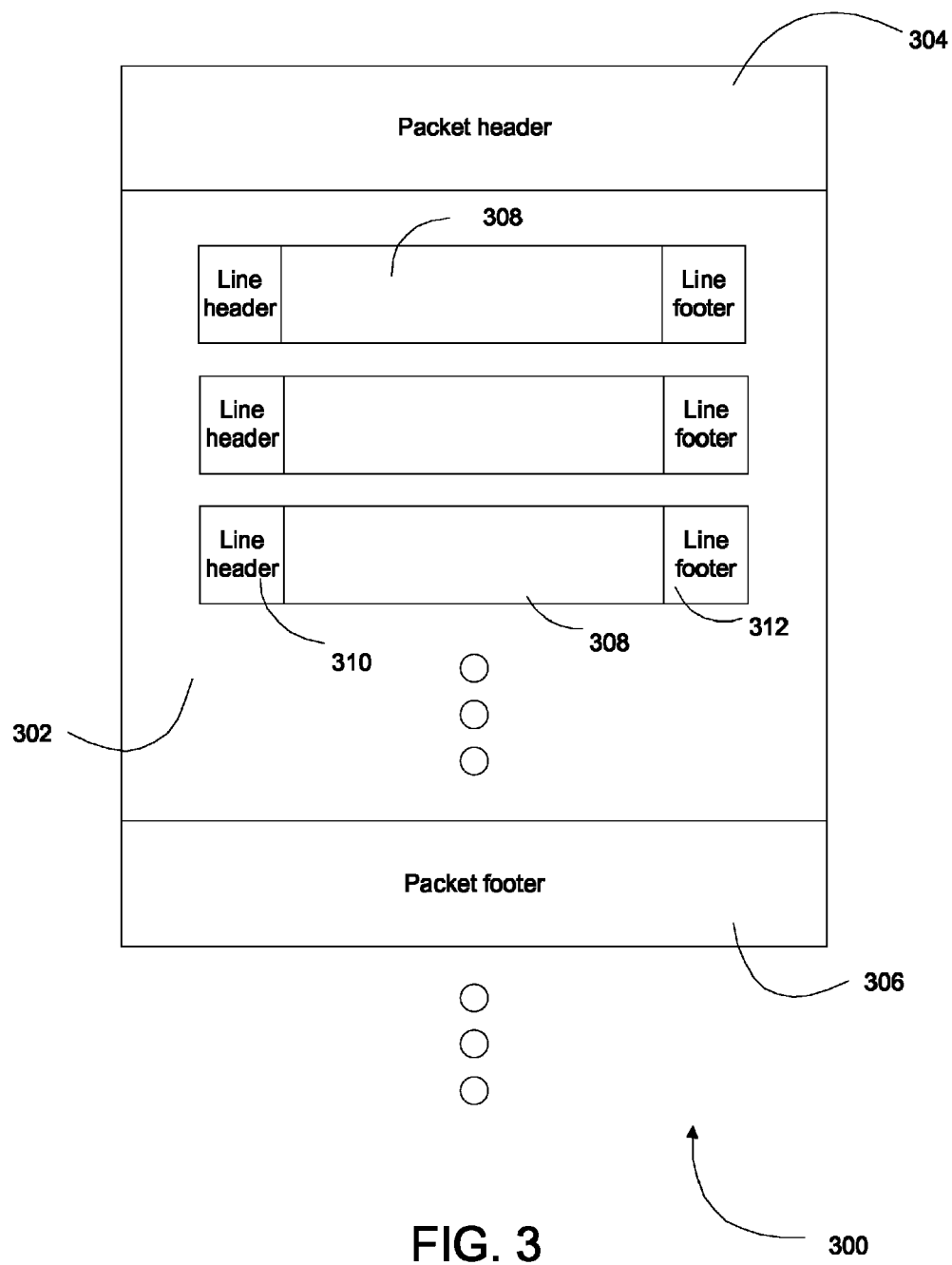
FIG. 3 illustrates image data transmitted as packets in accordance with an embodiment of the invention.

In several embodiments, image data from a plurality of focal planes can be packetized by inserting the image data and/or additional data describing the image data into a packet in such a way that a processor can reconstruct images of a scene from the received image data. A conceptual illustration of a packet including image data and additional data describing the image data transmitted by an imager array in accordance with an embodiment of the invention is illustrated in FIG. 3. The packet 302 includes a packet header 304 and a packet footer 306. The packet 302 also includes a number of lines 308 of image data, where each line 308 of image data includes a line header 310 and a line footer 312. In many embodiments, the packet header 304 and/or the line header 310 contain additional data that describes the image data in such a way that a device receiving the packet can reconstruct a plurality of images using image data including the lines of image data contained within the packet. The number of lines of image data included within the packet typically depends upon the requirements of a specific application. In many embodiments, the packet can contain all of the lines of image data for a single captured light field. The term light field can be used to describe a number of two dimensional images that are captured of a scene from different perspectives. In other embodiments, the lines of image data of a captured light field can be divided and sent in multiple packets. In many embodiments, image data captured by individual pixels or groups of pixels from within a line of pixels from different focal planes can be interleaved within a packet of image data.

In a number of embodiments, the packet header 304 contains embedded data. In many embodiments, the embedded data describes the camera module from which image data is generated in such a way that a processor can determine the structure of the image data in the packet and reconstruct images from the data received from the camera module. In several embodiments, a packet header 304 includes embedded data such as (but not limited to) the number of focal planes in an imager array, the timing of the image capture per focal plane, the identity of the particular focal planes being read out, the total number of pixels in a focal plane, the resolution of an image taken by a focal plane, the timing of the pixel read outs and the gain for the focal plane. As discussed below, the embedded data described above need not be included in a packet header and some or all of the information can be transmitted accompanying image data in different ways including but not limited to locating the additional data elsewhere in the packet and/or transmitting the additional data in a separate packet. Embedded data describing imaging data in accordance with embodiments of the invention is discussed further below.

In the illustrated embodiment, the lines 308 of image data include line headers 310. The line header identifies the focal plane or focal planes and pixels in the imager array that captured the image data contained within the line of image data. A processor can utilize the line header to identify the specific image data contained within the line 310 of image data. In various embodiments, a line header 310 includes information such as (but not limited to) the identify of the focal plane that captured the image data within the line and/or the identity of the specific pixels(s) or group of pixels used to capture the image data contained within the line of data, and a timestamp. Stated another way, a line of image data within a packet formatted in accordance with embodiments of the invention need not correspond to image data captured using a single line of pixels in a single focal plane. Indeed, packets of image data in accordance with embodiments of the invention can include lines of image data containing image data captured by different lines of pixels and/or from different focal planes. Inclusion of the additional data describing the line of image data in the line header allows a processor to receive and process image data from multiple images multiplexed into a single packet or stream of packets. Different types of embedded data that can be included in line headers (or elsewhere) in accordance with embodiments of the invention are discussed further below.

Each line 308 of image data can include a line footer 312 to indicate that the line of image data 308 associated with the preceding line header 310 has ended. Also, each packet 302 can include a packet footer 306 to indicate that the image data associated with the previous packet header 304 has ended. In many embodiments, the imager array is configured to generate multiple packets 302 to contain the image data captured by the focal planes and each packet includes multiple lines of image data.

Due to the manner in which image data is captured by different sets of pixels in different focal planes as data is transmitted by the imager array, the processor typically cannot predict the order in which it will receive image data from the imager array. In many embodiments, the processor has no knowledge of the focal plane or focal planes that captured the image data contained within a line of image data without reference to the packet header and/or the line header for the line of image data. However, in other embodiments the imager array imposes constraints with respect to the order in which image data is captured by specific focal planes (see for example the discussion below with respect to FIGS. 7a-7c) and a processor can rely upon the predetermined order of image data capture to reconstruct the image data. While imposing constraints on the order in which image data is captured can reduce the flexibility of the image array with respect to the manner in which image data is captured from different focal planes, the predictable manner in which image data is received from the imager array can result in the reduction in the amount of additional data transmitted in conjunction with the image data by removing information that identifies the focal plane and/or pixels that captured the image data. In many embodiments, the manner in which the imager array is constrained to capture image data enables the packet header, the packet footer, the line header and/or the line footer illustrated in FIG. 3 to be eliminated.

Although the inclusion of specific pieces of information within packet headers and/or line headers is described above, any information that enables the reconstruction of multiple images from image data multiplexed into a single packet or stream of packets can be incorporated into a packet of image data in accordance with embodiments of the invention. Transmission of image data compatible with the MIPI interface format is discussed further below.

Image Data Transmission Compatible with the MIPI Interface Format

Figure 4:
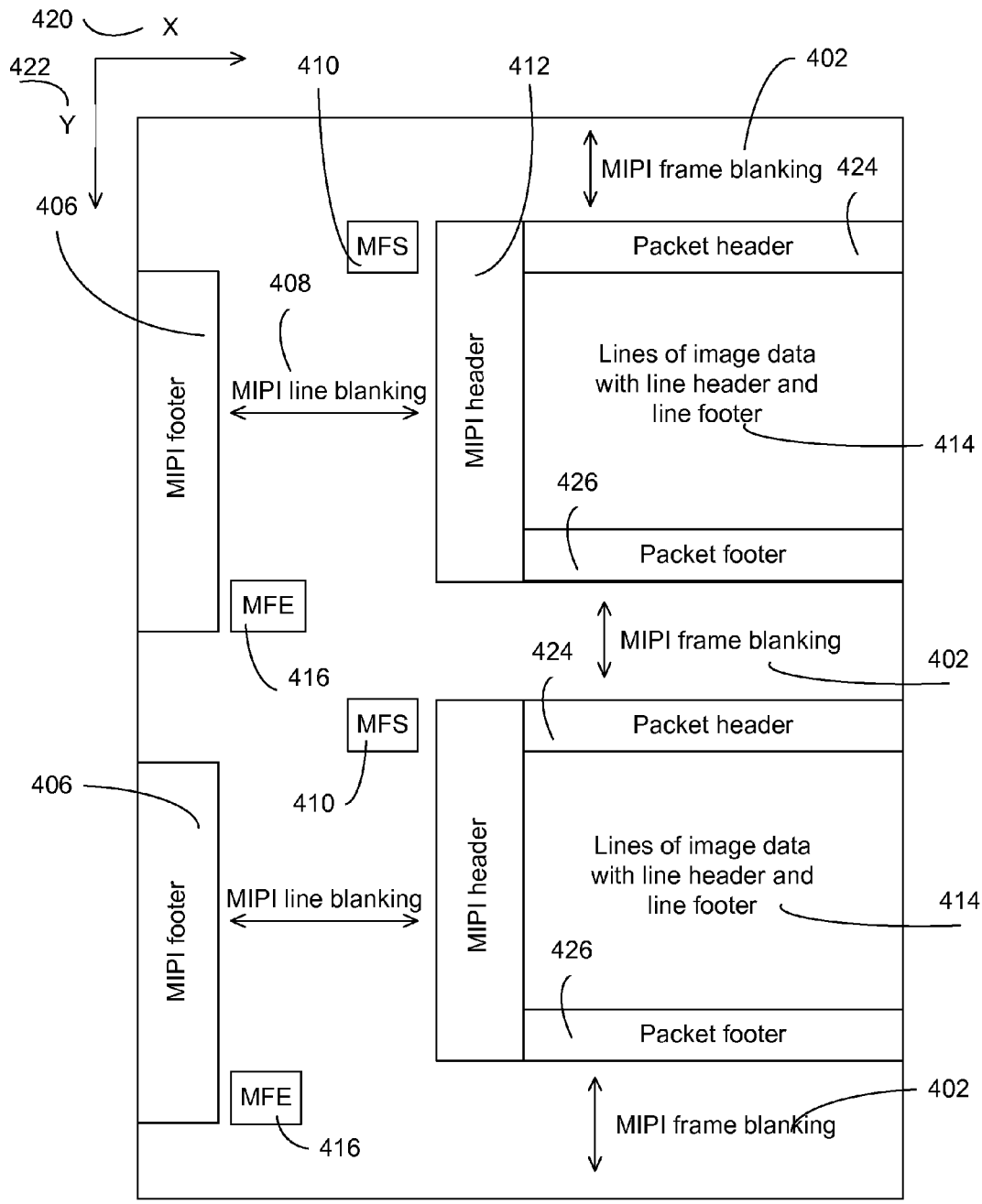
FIG. 4 illustrates transmission of image data as packets compatible with the MIPI CSI-2 standard interface format in accordance with an embodiment of the invention.

In several embodiments, imager arrays transmit image data and additional data describing the image data in a manner that is compatible with an existing interface format for the transmission of image data by a conventional camera including a single focal plane. A conceptual illustration of image data and additional data describing the image data transmitted as packets compatible with the MIPI CSI-2 standard interface format (MIPI interface format) in accordance with an embodiment of the invention is illustrated in FIG. 4. The conceptual illustration can be read as involving transmissions from left to right in the X direction 420 and from top to bottom in the Y direction 422. The transmission begins with a MIPI frame blanking interval 402. A MIPI frame start (MFS) 410 indicator is then sent by the imager array, followed by a portion of the MIPI header 412. A packet of data generated in accordance with embodiments of the invention is inserted within the standard MIPI container as embedded data. Accordingly, the first line of data within the MIPI container can include a packet header 424 containing information concerning the focal planes that generated the image data (see discussion above).

The transmission of the first line of the MIPI container is completed by the transmission of a MIPI footer 406. There is a pause during the MIPI line blanking interval 408, and then the next portion of the MIPI header 412 is transmitted. The next line of the MIPI container includes a line of image data 414. In embodiments where the order in which the lines of image data transmitted by the imager array is not predetermined, the line of image data can be preceded by a line header and followed by a line footer. In embodiments where the lines of image data are transmitted in a predetermined order (see for example the discussion of FIGS. 7a-7c), a line header and/or line footer may not be utilized.

The process of transmitting a MIPI footer, pausing during a MIPI line blanking interval, transmitting a portion of the MIPI header, and transmitting lines of image data within the MIPI container continues until all the lines of image data in the packet are transmitted. In several embodiments, an embedded packet footer is transmitted in the MIPI container to indicate that the transmission of the packet is complete. Following the transmission of the packet, the transmission of the MIPI container is completed by transmitting a MIPI footer 406 and a MIPI frame end 416. Although the packet illustrated in FIG. 4 involves transmitting one line of image data between line blanking intervals of the MIPI container, in many embodiments the packet header and the lines of image data do not correspond with the line blanking intervals of the MIPI container. Stated another way, a single line blanking interval of the MIPI container can contain image data from two or more lines of image data. Accordingly, the line headers and/or line footers are utilized to identify the individual lines of image data within the container.

As can readily be appreciated, the process illustrated in FIG. 4 involves formatting a packet of data including image data and additional data describing the image data generated in accordance with embodiments of the invention within a conventional MIPI container. In this way, an imager array can utilize an interface standard developed to enable the transmission of image data captured by a single focal plane to enable transmission of a packet of data containing image data captured by a plurality of focal planes (i.e. a light field). In other embodiments, similar processes can be utilized to transmit packets formatted in the manner outlined above using other containers and/or interface formats including (but not limited to) a CameraLink interface format, a USB interface format, or a Firewire interface format.

Additional Data Describing an Imager Array

Imager arrays in accordance with many embodiments of the invention additional data describing the imager array that can be embedded in a packet header or elsewhere in image data transmitted by the imager array. A processor can utilize the additional data describing the imager array to reconstruct images from the image data contained within the packet. In various embodiments, the additional data describing the imager array is divided into fixed descriptors and dynamic descriptors. Fixed descriptors are pieces of data within a packet header that are fixed values that are specific to an array camera configuration, and which do not change during array camera operation. Dynamic descriptors are pieces of data within the embedded data that can vary during array camera operation. In many embodiments, dynamic descriptors are parameters describing the operational states such as (but not limited to) focal plane exposure time or focal plane processing gain. In several embodiments, an imager array transmits image data and additional data including at least one of the total number of focal planes, the total number of pixels being read out per focal plane in a first dimension, the total number of pixels being read out per focal plane in a second dimension, the integration time of the pixels in each focal plane, and the gain applied to each pixel in each focal plain (which can be divided into analog gain and digital gain). The specific data transmitted describing the imager array typically depends upon the information that is provided to the receiving device about the imager array by other sources. In many embodiments, imaging characteristics such as the integration time can be specified by a receiving device such as a processor and the information is transmitted by the imager array to communicate to the receiving device that the imaging characteristics of the relevant focal planes have been updated in response to the instruction. In many embodiments, an imager array transmits image data and the gain applied to each pixel in each focal plane (which can be divided into analog gain and digital gain), and additional data including the integration time of the pixels in the active focal planes and at least one of the total number of focal planes, the total number of pixels being read out per focal plane in a first dimension, the total number of pixels being read out per focal plane in a second dimension. In other embodiments, any of a variety of combinations of information including additional pieces of information can be transmitted as additional data describing image data in accordance with embodiments of the invention.

In many embodiments, a transmitter within an imager array includes additional data describing the imager array in the packet header to allow the receiver within a processor to determine the structure of the data in a packet in order for the software in the processor to reconstruct the image data from the camera. The additional data describing the imager array in the packet header is largely dependent upon the specific application and array camera configuration.

In several embodiments, the additional data describing the imager array is transmitted as embedded data within a MIPI container using the embedded 8-bit non image data (datatype=0x12) format specified as part of the MIPI interface standard. The following table provides the structure of various fixed descriptors that can be utilized in additional data describing an imager array transmitted in accordance with many embodiments of the invention. Unless otherwise stated the byte order is MSB first. In several embodiments, one, multiple, and/or all of the following fixed descriptors can be included as embedded data within a packet header:

| Name | Length (bytes) | Description |
| --- | --- | --- |
| Data ID | 5 | Fixed field start of embedded data. Value is ASCII character string "PICAM". |
| Device ID | 4 | Device identification word. A product specific code. |
| Revision ID | 2 | Silicon revision word. Describes the version of the silicon |
| Manufacturer ID | 8 | Manufacturer identifier. |
| Array format M,N | 1 | Number of focal planes in M and N, where M is the number of focal planes per row in the imager array and N is the number of focal planes per column in the imager array. Upper 4 bits denote number of the focal planes along the X axis. |
| Start of focal plane image data capture time tag counter frequency | 2 | The frequency used to generate the start of focal plane image data capture time tag counter frequency values. The frequency is represented using a 16-bit fixed precision 8.8 format (0 to 255.99609 MHz in 0.00390625 MHz steps). |

The following table provides the structure of various dynamic descriptors that can be utilized in the additional data describing an imager array transmitted in accordance with embodiments of the invention. Unless otherwise stated the byte order is MSB first. In several embodiments, one, multiple, and/or all of the following dynamic descriptors can be included as embedded data within a packet header:

| Name | Length (bytes) | Description |
| --- | --- | --- |
| Active Focal Planes | 8 | One hot encoding of which focal planes are being readout in the upcoming packet. This provides information on which focal planes are active and providing image data. Supporting up to 64 focal planes. Each bit corresponds to a single focal plane within the array with a 1 indicating a given focal plane is being readout. The bit assignment corresponds to the scalar version of the focal plane number format. |

-continued

| Name | Length (bytes) | Description |
|---|---|---|
| Total pixels X | 2*M*N | Number of pixels being readout per focal plane in X. Each focal plane has a 16bit word. The focal plane ordering corresponds to the scalar version of the focal plane number format. Inactive focal plane (focal plane not part of the readout) are set to 0x0000h. |
| Total pixels Y | 2*M*N | Number of pixels being readout per focal plane in Y. The focal plane ordering corresponds to the scalar version of the focal plane numbering format. Inactive focal planes (focal planes not part of the readout) are set to 0x0000h. |

| Name | Length(bytes) | Description |
|---|---|---|
| Integration Time | 3*M*N | Integration time per focal plane (corresponding to the first row of image data in the upcoming packet) in units of microseconds. The focal plane ordering corresponds to the scalar version of the focal plane numbering format. Inactive focal planes (focal planes not part of the readout) are set to 0x000000h. |
| Analog Gain | 1*M*N | Analog Gain per focal plane (corresponding to the first row of image data in the upcoming focal plane) in linear units. The gain is represented using an 8bit fixed point 5.3 format (0 to 31.875x in 0.125 steps). The focal plane ordering corresponds to the scalar version of focal plane numbering format. Inactive focal planes (focal planes not part of the readout) are set to 0x00h. |
| Digital Gain | 1*M*N | Digital gain per focal plane (corresponding to the first row of image data in the upcoming focal plane) in linear units. The gain is represented using a 7bit fixed point 3.4 format. The focal plane ordering corresponds to the scalar version of focal plane numbering format. Inactive focal planes (focal planes not part of the readout) are set to 0x00h. |
| Packing Modulo | 2 | 16-bit integer defining the packing modulo of the pixel data (see discussion of FIGS. 7a-7c). Modulo 0 can mean modulo equal Total Pixels X (see above). |
| User | Variable | Reserved for system capability expansion. |
| Padding | Variable | Expands the length of the embedded data section to be equal to a line of the image data with a preceding line header and trailing line footer. The value of padding bytes is not specified. |

Referring to the above tables, each of the descriptors is discussed further below. Furthermore, although a specific number of bytes are used in embodiments throughout the specification for fixed and dynamic descriptors, any number of bytes may be utilized in other embodiments as appropriate to specific applications.

"Data identification (ID)" is a fixed descriptor of 5 bytes that can be used at the start of the embedded data. The value of which can be represented in an ASCII character string such as (but not limited to) "PICAM".

"Device ID" is a fixed descriptor of 4 bytes that can be used as a device identification word.

"Revision ID" is a fixed descriptor of two bytes in length. "Revision ID" is a silicon revision word and describes the version of the imager array.

"Manufacturer ID" is a fixed descriptor of 8 bytes in length. "Manufacturer ID" is a manufacturer identifier.

"Array format, M, N" is a fixed descriptor of 1 byte in length. "Array format" describes the number of focal planes in the imager array. In several embodiments, the array format specifies values M and N, where M is the number of focal planes per row in the imager array and N is the number of focal plane per column in the imager array.

"Start of focal plane image data capture time tag counter frequency" is a fixed descriptor of 2 bytes in length that indicates the frequency used to generate the start of focal plane image data capture time tag counter frequency values. In several embodiments, the frequency is represented using a 16-bit fixed precision 8.8 format (0 to 255.99609 MHz in 0.00390625 MHz steps). In other embodiments, any of a variety of data values can be utilized to represent the packet time tag values with precision appropriate to the specific application.

"Active focal plane" is a dynamic descriptor of 8 bytes in length. The "active focal plane" descriptor describes the focal planes that are read out in the upcoming packet. Certain embodiments provide for support of as many as 64 focal planes. In other embodiments, the number of focal planes can exceed 64 focal planes and the embedded data indicates the appropriate number of focal planes. Each bit corresponds to a single focal plane within the imager array with a 1 indicating that the packet contains image data captured using the focal plane.

"Total pixels X" is a dynamic descriptor of 2*M*N in length that describes the number of pixels being read out per focal plane in the X axis direction. In several embodiments, each pixel has a 16 bit word associated with it. Inactive focal planes (focal planes not part of the readout) can be set to 0x0000h.

"Total pixels Y" is a dynamic descriptor of 2*M*N in length that describes the number of pixels being readout per focal plane along the Y axis. Inactive focal planes (focal planes not part of the readout) can be set to 0x0000h.

"Integration Time" is a dynamic descriptor of 3*M*N in length that describes the integration time per focal plane (corresponding to the first row of data in the upcoming packet) in units of microseconds. Inactive focal planes (focal planes not part of the readout) are set to 0x000000h.

"Analog Gain" is a dynamic descriptor of 1*M*N in length that describes the analog gain per focal plane (corresponding to the first row of data in the upcoming packet) in linear units. In several embodiments, the gain is represented using an 8 bit fixed point 5.3 format (0 to 31.875× in 0.125 steps) value. Inactive focal planes (focal planes not part of the readout) are set to 0x00h.

"Digital Gain" is a dynamic descriptor of 1*M*N in length that describes the digital gain per focal plane (corresponding to the first row of data in the upcoming packet) in linear units. In several embodiments, the gain is represented using an 7 bit fixed point 3.4 format. Inactive focal planes (focal planes not part of the readout) are set to 0x00h.

"Packing Modulo" is a dynamic descriptor of 2 bytes length that defines the packing modulo process used to interleave pixel data from the active focal planes into a line of image data.

"User" is a dynamic descriptor of variable length that can be utilized to support system capability expansion.

"Padding" is a dynamic descriptor of variable length that allows for expansion of the length of the embedded data section to be equal to a line of the image data with preceding line header and trailing line footer. The value of padding bytes is not specified and is variable depending on the needs of the particular data section.

Although specific pieces of additional data describing an imager array in specific formats are disclosed above, the additional data describing an imager array (if any) transmitted by an imager array in accordance with an embodiment of the invention depends upon the requirements of a specific application. In many embodiments, a combination of the above pieces of additional data and/or other pieces of additional data describing the imager array are transmitted so that a processor receiving the information can reconstruct images from the image data captured by a imager array in accordance with embodiments of the invention. Accordingly, the manner in which image data is transmitted between the imager array and the processors is not limited in any way to transmissions that include a specific set of additional data describing the imager array. Specific sets of additional data describing an imager array including (but not limited to) one or more of the dynamic descriptors identified above can, however, facilitate the reconstruction of images by a processor.

Additional Data Describing a Line of Image Data

Imager arrays in accordance with many embodiments of the invention format image data captured by groups of pixels within one or more focal planes into a line of image data and can transmit the line of image data with additional data describing the line of image data to other devices. A single line of image data typically corresponds to image data captured by a row or a column of pixels within each active focal plane in an imager array. In many embodiments, however, a line of image data can correspond to image data captured from pixels in one or more rows of one or more active focal planes (see discussion of FIGS. 7a-7c below). In the context of the transmission of packets of data illustrated in FIG. 4, lines of image data (possibly including a line header containing additional data describing the line of image data and a line footer) are transmitted within a MIPI container between line blanking intervals.

Figure 5:
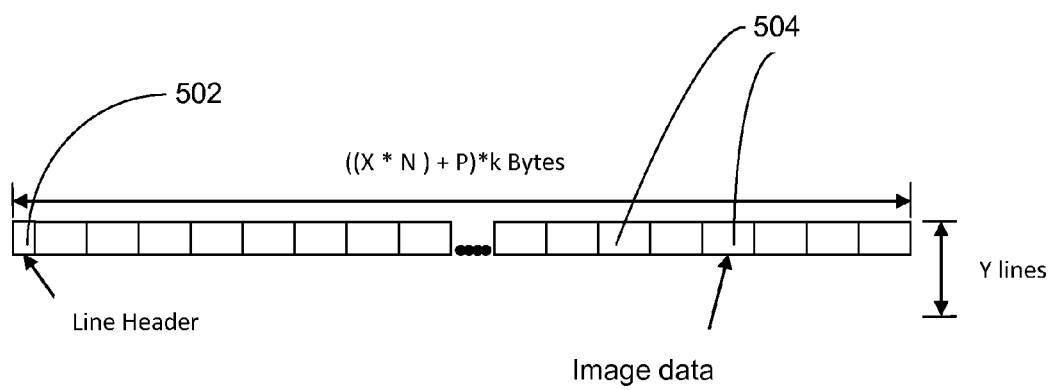
FIG. 5 is an illustration of a transmission of a line of image data in accordance with an embodiment of the invention.
Figure 5:

The transmission of a line of image data and a line header containing additional data describing the line of image data by an imager array in accordance with an embodiment of the invention is conceptually illustrated in FIG. 5. The line of image data 500 begins with a line header 502 containing additional data that describes the line of image data, followed by captured image data 504, and terminates with a footer indicating that the particular line of image data is complete. Referring back to FIG. 4, when a line of image data is transmitted in accordance with a transmission format similar to the MIPI interface format, the line header and line footer are located within the data 414 (i.e. are distinct from the packet header (PH) 424 and the packet footer (PF) 426). Although much of the discussion refers to the inclusion of additional data describing a line of image data in the line header, in many embodiments additional data describing the imager array can also be included in a line header. Furthermore, additional information describing a line of image data need not be located within a line header and can be communicated elsewhere with respect to the image data.

A variety of different control schemes can be utilized to control the timing of the capture of image data by different pixels within the focal planes of an imager array and with respect to the transmission of the captured image data by the imager array. In several embodiments, image data from a specific focal plane is captured one row (or column) of pixels at a time. As noted above, the focal planes in an imager array can be separately controlled. Therefore, the sequence with which rows of image data are read from each focal plane can vary depending upon control parameters including, but not limited to, exposure time associated with each focal plane. When image data is captured by the pixels, the image data is read out. The image data is not typically transmitted directly from the pixels but is buffered. The amount of data that is buffered typically depends upon the rate at which image data is captured and the rate with which image data can be transmitted off-chip by the imager array. As discussed above, the amount of buffered pixel data can also depend upon the number of active focal planes.

In numerous embodiments, a line of image data may be a row of pixel data from each active focal plane, a column of pixel data from each active focal plane or any other grouping of image data captured by pixels within one or more focal planes. Accordingly, the term "line" is a generic term. In many embodiments, the line of image data includes image data captured from pixels in a single focal plane. In other embodiments, the line of image data includes image data captured from multiple focal planes. Additional data describing the line of image data allows software or hardware on a receiver to determine from which focal plane(s), which row/column and/or which pixels on that focal plane captured specific image data within a line of image data.

In several embodiments, the image data is transmitted using the RAW8 or RAW10 data formats defined within the MIPI interface format, although other data formats can be supported as necessary including formats involving 8 bits per pixel and formats involving 10 bits per pixel.

In a variety of embodiments, the size of image data with accompanying line headers containing additional data describing the image data transmitted by a imager array when capture of a light field occurs (i.e. including all the image data associated with the images of the scene captured by each of the focal planes in the imager array) in bytes can be calculated using the following equation:

$$((X*N)+P)*Y*k$$

where X is the total pixels in an row of pixels within a specific focal plane,

Y is the total pixels along a Y axis,

N is the number of focal planes in an array,

P is the line header length, and k is a scale factor that can be used to account for 10 bits per pixel transmission (where 8 bits per pixel (bpp) yields k=1 and 10 bpp yields k=1.25).

In the case of 10 bits per pixel transmission, each line of data is padded with additional pixels to provide an integer multiple of 4. Padding pixels can have a value of 0x3Fh.

In many embodiments, the additional data describing a line of image data can include one or more of timing information concerning the frame to which the image data from each focal plane belongs, and the row (column) number in each focal plane from which image data in the line of image data is read out. In a number of embodiments, each line of data is preceded by a line header containing the additional information describing the line of image data, which provides the processor with the necessary information about the line data to reconstruct the images captured by the focal planes. The following table provides additional data that can be included in a line header in accordance with an embodiment of the invention to enable reconstruction of images by a processor:

| Name | Length (Bytes) | Description |
| --- | --- | --- |
| Start of focal plane image data capture time tag | <=4*M*N | A (nominally) 32-bit number for each focal plane corresponding the relative start time for the readout of the focal plane. The start time of a focal plane capturing image data is captured from a free running 32bit counter internal to the transmitter counting in units of clock cycles where the frequency of the counter is defined in the embedded image data line header. The focal plane ordering corresponds to the scalar version of the focal plane numbering format. Inactive focal planes (as defined in the active focal planes field of the embedded data in the packet header) shall have their start of focal plane image data capture time tag omitted. Note in 10 bits per pixel transmission mode the individual bytes are expanded to 10 bits and padded with 2 LSBs = 00. |
| Row Numbers | <=2*M*N | A (nominally) 16-bit line number for each focal plane indicating from which physical row in the focal plane the subsequent data is from. Nonphysical rows (virtual rows) that may be transmitted can have their row number set to 0xffffh. The focal plane ordering corresponds to the scalar version of the focal plane numbering format. Inactive focal planes (as defined in the active focal planes field in the embedded data of the packet header) shall have their line number omitted. Note in 10 bits per pixel transmission mode the individual bytes are expanded to 10 bits and padded with 2 LSBs = 00. |
| Padding | Variable (0 or 2) | Variable padding range to ensure the line header falls on a modulo 5 byte boundary in the case of 10 bits per pixel transmission. Padding words shall have the value of 0x3Fh |

Referring to the above table, each of the descriptors is discussed further below. Furthermore, although a specific number of bytes are used in embodiments throughout the specification for fixed and dynamic descriptors, any number of bytes may be utilized in other embodiments as appropriate to specific applications.

"Start of focal plane image data capture time tag" is equal to or less than 4*M*N bytes in length and describes a (nominally) 32 bit number for each focal plane corresponding the relative start time for the readout of the focal plane. The start of the image data associated with a pixel can be captured from a free running 32 bit counter internal to the transmitter within the imager array counting in units of clock cycles where the frequency of the counter is defined in the embedded data. Inactive focal planes (as defined in the active focal plane field of the embedded data of the packet header) can have their start of focal plane image data capture time tag omitted. Note in 10 bits per pixel transmission mode the individual bytes are expanded to 10 bits and padded with 2 LSBs=00.

"Row Numbers" is equal to or less than 2*M*N bytes in length and describes a (nominally) 16 bit line number for each focal plane indicating from which physical row or line in the focal plane the subsequent image data is from (the appropriate number of bits depends upon the number of lines of pixels and need not be 16 bits). Nonphysical rows or lines (virtual rows or lines) that may be transmitted can have their row or line number set to 0xffffh. Inactive focal planes (as defined in the active focal plane field of the embedded data) can have their line number omitted. In 10 bits per pixel transmission mode, the individual bytes are expanded to 10 bits and padded with 2 LSBs=00.

"Padding" is of variable bytes in length (such as 0 or 2 in certain embodiments). A variable padding range enables the line header to fall on a modulo 5 byte boundary in the case of 10 bits per pixel transmission. In several embodiments, padding words have the value of 0x3Fh.

Although specific pieces of additional data describing a line of image data in specific formats are disclosed above, the additional data describing a line of image data (if any) transmitted accompanying a line of image data by a imager array in accordance with an embodiment of the invention depends upon the requirements of a specific application. In many embodiments, a combination of the above pieces of additional data and/or other pieces of additional data are transmitted in a line header so that a processor receiving the additional data describing the lines of image data can reconstruct images from the image data captured by a imager array in accordance with embodiments of the invention. Accordingly, the manner in which data is transmitted between the imager array and the processor is not limited in any way to transmissions that include a specific set of additional data describing lines of image data. Specific sets of additional data describing lines of image data can, however, facilitate the reconstruction of images by a processor.

Including Additional Data Describing Imager Array in Line Headers

As discussed above, additional data describing an imager array may be utilized to allow a receiver to determine the structure of image data in a packet and reconstruct images. In certain embodiments, the additional data describing an imager array can be included in a line header that may also contain additional data describing a line of image data. This can be advantageous in certain embodiments where the packet header length may be limited or the separate transmission of additional information describing an imager array is not desirable.

The following table includes additional data describing an imager array that can be included in a line header in accordance with an embodiment of the invention to enable reconstruction of images by a processor:

| Name | Length (Bytes) | Description |
| --- | --- | --- |
| Free running mode | 2 | Fixed value of ASCII code for "FR". Note in 10 bits per pixel transmission mode the individual bytes are expanded to 10 bits and padded with 2 LSBs = 00. |
| Packet counter | 2 | Arbitrary packet number counter. Initialized to zero upon reset. Incremented by one for every packet transmitted in accordance with the MIPI interface format. Wraps around at 0xffff. Note in 10 bits per pixel transmission mode the individual bytes are expanded to 10 bits and padded with 2 LSBs = 00. |
| Row number | <=2*M*N | A (nominally) 16-bit line number for each focal plane indicating from which physical row in the focal plane the subsequent data is from. Nonphysical rows (virtual rows) that may be transmitted can have their row number set to 0xffffh. The focal plane ordering corresponds to the scalar version of the focal plane numbering format. Inactive focal planes (as defined in the active focal planes field of the embedded data) shall have their line number omitted. Note in 10 bits per pixel transmission mode the individual bytes are expanded to 10 bits and padded with 2 LSBs = 00. |
| Padding | Variable (0 or 2) | Variable padding range to ensure the line header falls on a modulo 5 byte boundary in the case of 10 bits per pixel transmission. Padding words shall have the value of 0x3Fh |

Referring to the above table, each of the descriptors is discussed further below. Furthermore, although a specific number of bytes are used in embodiments throughout the specification for fixed and dynamic descriptors, any number of bytes may be utilized in other embodiments as appropriate to specific applications.

"Free running mode" is equal to 2 bytes in length and describes a fixed value of ASCII code for "FR". Note in 10 bits per pixel transmission mode the individual bytes are expanded to 10 bits and padded with 2 LSBs=00.

"Packet counter" is equal to 2 bytes in length and describes an arbitrary packet number counter. This may be initialized to zero upon reset, incremented by one for every packet transmitted in the MIPI interface format and wraps around at 0xffff. Note in 10 bits per pixel transmission mode the individual bytes are expanded to 10 bits and padded with 2 LSBs=00.

"Row Number" is equal to or less than 2*M*N bytes in length and describes a (nominally) 16 bit row (column) number for each focal plane indicating from which physical row or line in the focal plane the subsequent image data is from (the appropriate number of bits depends upon the number of lines of pixels and need not be 16 bits). Nonphysical rows or lines (virtual rows or lines) that may be transmitted can have their row or line number set to 0xffffh. Inactive focal planes (as defined in the active focal plane field of the embedded data) can have their line number omitted. In 10 bits per pixel transmission mode, the individual bytes are expanded to 10 bits and padded with 2 LSBs=00.

"Padding" is of variable bytes in length (such as 0 or 2 in certain embodiments). A variable padding range enables the line header to fall on a modulo 5 byte boundary in the case of 10 bits per pixel transmission. In several embodiments, padding words have the value of 0x3Fh.

Although specific pieces of additional data describing an imager array that can be included in a line header are disclosed above, the additional data transmitted with a line of image by an imager array in accordance with an embodiment of the invention depends upon the requirements of a specific application. In many embodiments, a combination of the above pieces of additional data describing the imager array and/or other pieces of additional data describing the imager array and/or one or more lines of image data are transmitted in a line header so that a processor receiving the information can reconstruct images from the image data captured by the imager array. Accordingly, the manner in which data is transmitted between the imager array and a receiver is not limited in any way to transmissions that include a specific set of additional data in the line headers or packet headers.

Light Field Capture and Transmission Processes

Imager arrays in accordance with many embodiments of the invention can capture image data using multiple focal planes and transmit the image data and additional information describing the image data to a processor. As noted above, the need to transmit the image data and additional data describing the image data within a specific container may influence the manner in which the data is transmitted. As noted above, the additional data describing the image data typically depends upon the manner in which the image data is captured and the characteristics of the imager array used to capture the light field.

Figure 6:
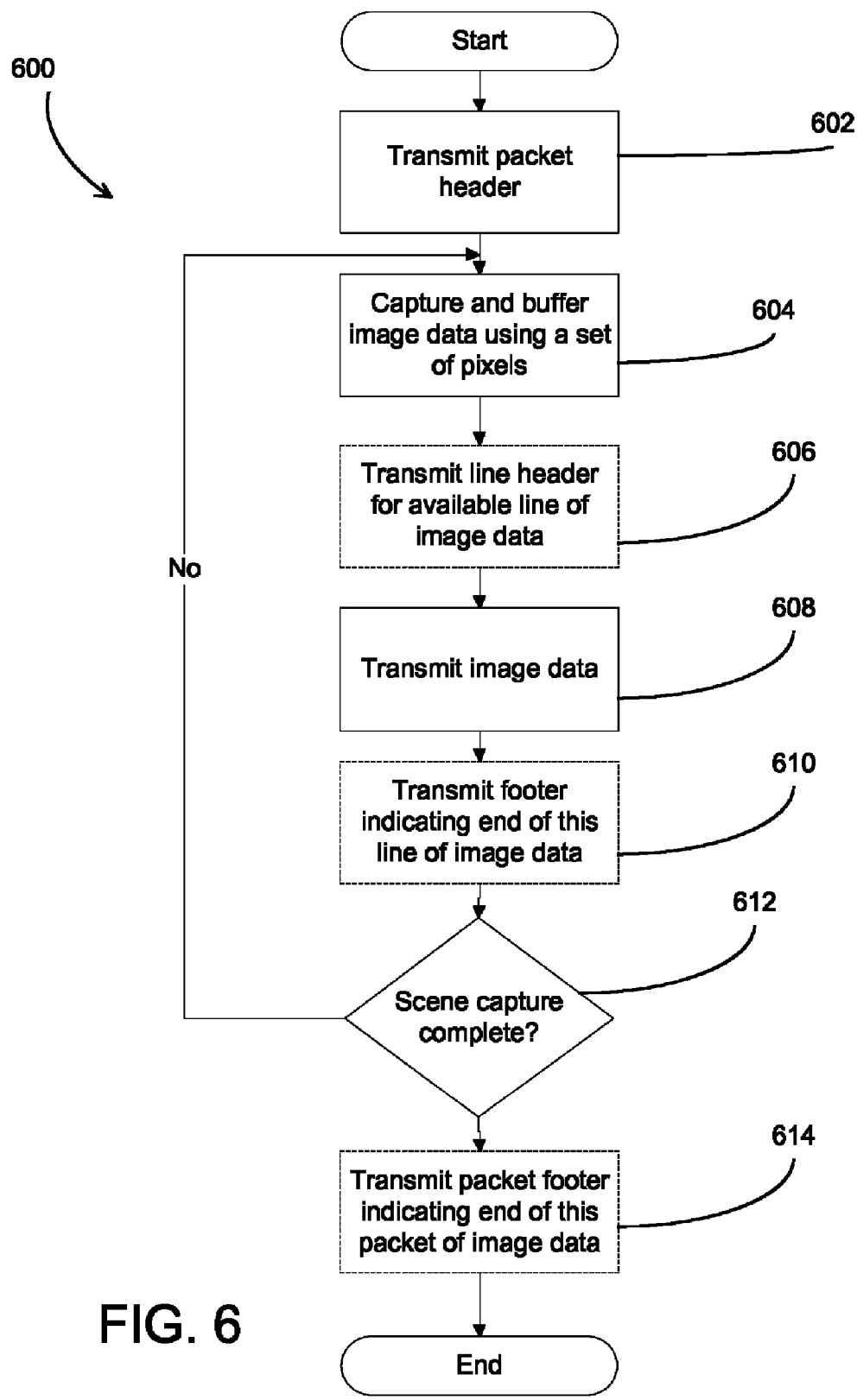
FIG. 6 is a process for transmitting image data captured by an imager array in accordance with an embodiment of the invention.

A process for capturing a light field and transmitting the image data and additional data describing the image data to an external device such as (but not limited to) a processor using an imager array in accordance with an embodiment of the invention is illustrated in FIG. 6. The process 600 can commence by transmitting a packet header (602) that includes additional data describing the imager array. As noted above, the transmission of a packet header can be optional. During the process, image data is captured (604) by the pixels in the imager array. In various embodiments, capturing (604) image data involves controlling the pixels and pixel settings used when capturing the image data. In certain embodiments, the pixel settings can be performed globally per focal plane. In many embodiments, the process also includes resetting the pixels after the capture of image data.

In many embodiments, a line header including additional data describing the a line of image data is transmitted (606) by the imager array, and then a line of captured image data is transmitted (608). As noted above, the line of image data can include image data from one or more focal planes and the additional data can identify the groups of pixels and/or the focal planes that captured the image data within the line of image data. Upon completion of the transmission of a line of image data, a line footer can optionally be transmitted (610) by the imager array to indicate that the transmission of the line of image data is complete. The process repeats until a determination (612) is made that the capture of the light field (i.e. a plurality of two dimensional images captured from different viewpoints) using the plurality of focal planes is complete. Following the completion of the transmission of image data by the imager array, the imager array can optionally transmit (614) a packet footer that indicates the completion of the packet of data. As noted above, the specific manner in which the image data and the additional data describing the image data is transmitted is often dictated by an interface format (e.g. the MIPI interface format).

In several embodiments, line headers, line footers and/or packet footers are omitted based on the image data being configured to capture a predetermined amount of image data and/or the transmission of the captured image data in a predetermined sequence. Although a specific process for transmitting image data and additional data describing the image data is discussed above with respect to the process illustrated in FIG. 6, any of a variety of processes that enable the transmission of lines of image data captured using different focal planes and additional data that can be utilized to construct a plurality of images from the lines of image data can be utilized in accordance with embodiments of the invention. Processes for transmitting image data captured in a predetermined manner by an imager array are discussed further below.

Interleaving Image Data from Multiple Focal Planes

In a number of embodiments, image data from multiple focal planes can be interleaved in a predetermined manner to simplify the transmission of image data and reduce the amount of additional data describing the image data that is transmitted accompanying the image data. In many embodiments, imager arrays use a "modulo" scheme for interleaving the captured image data into a packet in a predetermined manner. A modulo scheme involves capturing and transmitting image data from the same group of pixels in each active focal plane (or each focal plane in a group of focal planes) within an imager array, such as the same row, rows, column, or columns. In other embodiments, a modulo scheme can involve specifying the specific row (or column) from a set of focal planes and then reading out corresponding pixels or groups of pixels from each specified row (or column).

Three different modulo processes for capturing and transmitting image data in accordance with embodiments of the invention are illustrated in FIGS. 7a-7c. A line of image data transmitted in accordance with a first modulo process 726 is illustrated in FIG. 7a and involves transmitting the first pixel 702 from a row selected from each of a total of twenty focal planes before transmitting the second pixel 704 from the selected row from each of the 20 focal planes. Accordingly, the process illustrated in FIG. 7a can be referred to as a modulo one process. As can readily be appreciated, the number of focal planes is arbitrary. In several embodiments, the specific rows transmitted by each focal plane can be specified in additional data contained within a line header transmitted prior to the transmission of the image data.

Similarly, a line of image data transmitted in accordance with a second modulo process 728 is conceptually illustrated in FIG. 7b and involves transmitting pairs of pixels from a selected row in each of the active focal planes. In the illustrated embodiment, the first 706 and second 708 pixels from a selected row in each of a total of twenty focal planes is transmitted before transmitting the third 710 and fourth 712 pixels of the selected rows. The process repeats transmitting pairs of pixels from the selected row in each focal plane until the transmission of the image data captured by the selected rows of pixels is complete. Accordingly, the process illustrated in FIG. 7b can be referred to as a modulo two process.

A line of image data transmitted in accordance with a third modulo process 730 is conceptually illustrated in FIG. 7c and involves transmitting the first 714, second 716 and third 718 pixels of a row selected from each of a total of twenty active focal planes before transmitting the fourth 720, fifth 722 and sixth pixels (not shown) from each of the selected rows. The process repeats transmitting sets of three pixels from the relevant row in each focal plane until the transmission of the image data captured by the selected rows of pixels is complete. Accordingly, the process illustrated in FIG. 7c can be referred to as a modulo three process.

For each modulo transmission process, the transmission of image data from selected rows in each active focal plane can continue until all of the pixels in all of the focal planes are transmitted. In embodiments where different modulo transmission processes are supported, the imager array can provide additional data indicating the modulo process that is being utilized. In addition, the imager array can provide additional data describing the image data to enable reconstruction of images from the image data including (but not limited to) additional data indicating the active focal planes and/or information with respect to each line of image data specifying the selected rows (columns) in each active focal plane from which the image data is being read out. Although specific transmission processes are discussed above, image data can be transmitted in any order in accordance with embodiments of the invention, and is not limited to interleaving image data from multiple focal planes in a modulo transmission process.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of transmitting image data, comprising:
    capturing light field image data using a plurality of active focal planes in a camera module comprising an imager array and an optic array of lens stacks,
        where each active focal plane comprises a plurality of rows of pixels that also form a plurality of columns of pixels and each active focal plane is contained within a region of the imager array that does not contain pixels from another active focal plane, and
        where an image is formed on each active focal plane by a separate lens stack in said optic array of lens stacks;
    selecting at least one pixel from at least one row and at least one column in at least two active focal planes of the plurality of active focal planes;
    forming corresponding groups of image data based on said selecting and generating lines of image data by interleaving said corresponding groups of image data;
    generating additional data, where said additional data includes information for deinterleaving a plurality of images from the generated lines of image data; and
    transmitting, from the camera module, said generated lines of image data together with said additional data.

2. The method of claim 1, wherein said additional data describes said imager array.

3. The method of claim 2, wherein said additional data includes data selected from the group consisting of additional data describing:
    a number of active focal planes in an imager array;
    dimensions of an array of active focal planes in an imager array;
    a number of pixels in each dimension of at least one active focal plane;
    an integration time for pixels in at least one active focal plane; and
    a gain for pixels in at least one active focal plane.

4. The method of claim 3, wherein said additional data that describes a gain for pixels in at least one focal plane includes additional data that describes analog gain for pixels in at least one active focal plane and additional data that describes digital gain for pixels in at least one active focal plane.

5. The method of claim 1, wherein said corresponding groups of image data are formed using single pixels from a selected row and a selected column of an active focal plane.

6. The method of claim 1, wherein:
    said corresponding groups of image data are formed using at least two pixels from a selected row and a selected column of an active focal plane; and
    said additional data indicates a number of pixels in said corresponding groups of image data.

7. The method of claim 1, wherein interleaving said corresponding groups of image data comprises interleaving pixels selected from corresponding rows and columns in said at least two active focal planes.

8. The method of claim 1, wherein said additional data describes at least one generated line of image data.

9. The method of claim 8, wherein said additional data includes data selected from the group consisting of additional data describing:
    a time at which at least one active focal plane started capturing image data; and
    at least one row number for a row in at least one active focal plane used to capture image data interleaved in a line of image data.

10. The method of claim 1, further comprising:
    packetizing said generated lines of image data together with said additional data to produce at least one packet of data; and
        wherein transmitting said generated lines of image data together with said additional data further comprises transmitting said at least one packet of data.

11. The method of claim 10, wherein:
    a packet of data produced by packetizing said generated lines of image data together with said additional data comprises a packet header containing at least a portion of said additional data and a plurality of said generated lines of image data; and
    said at least a portion of the additional data contained in the packet header describes said imager array.

12. The method of claim 10, wherein a packet of data produced by packetizing said generated lines of image data together with said additional data further comprises a packet footer indicating an end of transmission of said generated lines of image data.

13. The method of claim 10, wherein:
a packet of data produced by packetizing said generated lines of image data together with said additional data comprises a plurality of said generated lines of image data and a line header associated with each of the plurality of said generated lines of image data; and
each line header includes additional data describing the generated line of image data with which the line header is associated.

14. The method of claim 13, wherein said line header further comprises additional data describing said imager array.

15. The method of claim 10, further comprising:
pausing transmitting said at least one packet of data during frame blanking intervals;
transmitting said generated lines of image data together with said additional data between frame intervals; and
pausing during said transmission of said generated lines of image data together with said additional data during line blanking intervals.

16. A method of receiving light field image data captured using a plurality of active focal planes in a camera module comprising an imager array and an optic array of lens stacks, where each active focal plane comprises a plurality of rows of pixels that also form a plurality of columns of pixels, each active focal plane is contained within a region that does not contain pixels from another active focal plane, and an image is formed on each active focal plane by a separate lens stack in said optic array of lens stacks, the method comprising:
receiving lines of image data from a camera module including a plurality of active focal planes using interface circuitry,
where each active focal plane comprises a plurality of rows of pixels that also form a plurality of columns of pixels, each active focal plane is contained within a region that does not contain pixels from another active focal plane, and said received lines of image data comprise interleaved groups of image data captured by corresponding groups of at least one pixel from at least one row and at least one column in at least two of the plurality of active focal planes; receiving additional data using the interface circuitry,
where said additional information includes information for deinterleaving a plurality of images from said received lines of image data; and
deinterleaving image data that is part of one of said plurality of images from said received lines of image data using said interface circuitry.

17. The method of claim 16, wherein deinterleaving image data that is part of one of said plurality of images from said received lines of image data using said interface circuitry further comprises configuring the interface circuitry to deinterleave image data that is part of one of said plurality of images from said received lines of image data using said additional data.

18. The method of claim 16, wherein said additional data includes data selected from the group consisting of additional data describing:
a number of active focal planes in an imager array;
dimensions of an array of active focal planes in an imager array;
a number of pixels in each dimension of at least one active focal plane;
an integration time for pixels in at least one active focal plane; and
a gain for pixels in at least one active focal plane.

19. The method of claim 18, wherein said additional data that describes a gain for pixels in at least one active focal plane includes additional data that describes analog gain for pixels in at least one active focal plane and additional data that describes digital gain for pixels in at least one active focal plane.

20. The method of claim 16, wherein said additional data indicates the number of pixels in the corresponding groups of at least one pixel.

21. The method of claim 16, wherein said interface circuitry includes a processor configured to deinterleave image data that is part of one of said plurality of images from said received lines of image data.

22. A system for receiving light field image data captured using a plurality of active focal planes in a camera module comprising an imager array and an optic array of lens stacks, where each active focal plane comprises a plurality of rows of pixels that also form a plurality of columns of pixels, each focal plane is contained within a region that does not contain pixels from another focal plane, and an image is formed on each active focal plane by a separate lens stack in said optic array of lens stacks, the system comprising:
interface circuitry configured to:
receive lines of image data from a camera module including a plurality of active focal planes using interface circuitry,
where each active focal plane comprises a plurality of rows of pixels that also form a plurality of columns of pixels, each active focal plane is contained within a region that does not contain pixels from another active focal plane, and said received lines of image data comprise interleaved groups of image data captured by corresponding groups of at least one pixel from at least one row and at least one column in at least two of the plurality of active focal planes; receive additional data using the interface circuitry,
where said additional information includes information for deinterleaving a plurality of images from said received lines of image data; and
deinterleave image data that is part of one of said plurality of images from said received lines of image data using said interface circuitry.

23. The system of claim 22, wherein said interface circuitry is configured to deinterleave image data that is part of one of said plurality of images from said received lines of image data by said additional data.

24. The system of claim 22, wherein said additional data includes data selected from the group consisting of additional data describing:
a number of active focal planes in an imager array;
dimensions of an array of active focal planes in an imager array;
a number of pixels in each dimension of at least one active focal plane;
an integration time for pixels in at least one active focal plane; and
a gain for pixels in at least one active focal plane.

25. The system of claim 24, wherein said additional data that describes a gain for pixels in at least one active focal plane includes additional data that describes analog gain for pixels in at least one active focal plane and additional data that describes digital gain for pixels in at least one active focal plane.

26. The system of claim 22, wherein said interface circuitry includes a processor configured to deinterleave image data that is part of one of said plurality of images from said plurality of lines of image data.

* * * * *